3,164,591
PREPARATION OF CYANURIC ACID
Wilhelm E. Walles, Midland, and Stanley S. Leff, Bay City, Mich., assignors to The Dow Chemical Company, Midland, Mich., a corporation of Delaware
No Drawing. Filed May 15, 1961, Ser. No. 109,857
6 Claims. (Cl. 260—248)

This invention relates to a new and improved method for making cynauric acid from urea.

It is well known that when urea is heated above its melting point, cynauric acid is formed along with biuret, ammelide, and other urea condensation products according to the conditions of heating. It is known that the presence of an acidic substance promotes the formation of cyanuric acid and suppresses the production of undesirable by-products. If the acidic substance is sufficiently acidic, it will react with ammonia formed in the course of the condensation reaction to make ammonium salts which complicate the separation of a pure product.

It has now been found that the thermal condensation of urea to cynauric acid is advantageously carried out when urea is dissolved in a solvent of the general formula

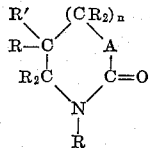

wherein R is hydrogen or a lower alkyl group containing 1–4 carbon atoms, R' is hydrogen, a lower alkyl group containing 1–4 carbon atoms, or phenyl, A is an oxygen atom or $CR_2$, R being as defined above, and $n$ is zero or one when A is oxygen and $n$ is zero when A is $CR_2$. The general formula shown therefore includes 2-pyrrolidinones, 2-oxazolidinones, and tetrahydro-1,3-oxazin-2-ones, all of which may be substituted as specified. When a solution of urea in a solvent such as described is heated at from about 150° C. to 250° C., ammonia is given off as the condensation proceeds and the product, cyanuric acid, which is essentially insoluble in these solvents, is precipitated as a substantially pure crystalline solid easily separable from the reaction mixture. By proper selection of temperature and time of heating, the condensation of urea to cyanuric acid may be run to substantial completion or it may run to a predetermined degree of completion, the precipitated cynauric acid in either case thereupon being separated from the mixture, and the solvent recycled to the process. The process may also be run by subjecting the urea solution to a preliminary heating step at about 130–150° C. whereby most or all of the theoretical quantity of ammonia is liberated, but without forming an appreciable amount of cynauric acid, an intermediate compound or complex evidently being formed during this step. The cyanuric acid product may then be formed and separated from the solution by heating at 150° C. or above for a sufficient period of time. The removal of ammonia from the solution may be accelerated by application of vacuum during the preliminary heating step. This method of carrying out the process is particularly adaptable to continuous operation. In such a continuous proces, the urea solution is conveniently heated at about 130–150° C. in a reactor vessel until ammonia evolution is substantially complete, moderate vacuum being applied if desired to facilitate removal of the ammonia, and the solution then is passed through another reactor of suitable dimensions, conveniently a coil reactor, which is maintained at about 150–250° C. The precipitated cyanuric acid is then separated by filtration from the product slurry and the filtrate is recycled to the process. About 100 mm. Hg is a satisfactory level of vacuum for removal of ammonia at 130–150° C.

The time required to condense a major proportion of the dissolved urea to cynauric acid is about 1–8 hours at 150 to 250° C. The reaction is accelerated, and, in some cases, better results, as far as purity of product is concerned, may be obtained by adding to the urea solution a minor proportion of water, either at the start of or during the heating period. By minor proportion is meant less than about 50% of water based on the weight of solvent. Addition of up to about 20% of water is preferred. It is not necessary that all the added water should dissolve in the solvent so long as an appreciable portion of it does so. Such added water is normally largely or entirely boiled out of the reaction mixture by the end of the condensation process.

The heterocyclic compounds described by the general formula shown above have many advantages as solvents in this process. Although acids are known to promote the formation or cyanuric acid from urea and acidic solvents have been used for the purpose, such acidic substances often are disadvantageous in that they either react with or dissolve appreciable amounts of the ammonia given off in the process. The solvents used in our process are essentially neutral and they are also inert to ammonia at reaction temperatures. The ammonia formed in the condensation is therefore free to escape from the reaction mixture and the solvent retains its catalyzing nature. These solvents are stable under the conditions of the reaction and may be recycled in the process after separation of all or most of the product. Urea is soluble in them while cyanuric acid is relatively insoluble. The separation of the product from the reaction mixture is accomplished easily by filtration or the solvent may be removed by distillation, leaving the product as a residue.

These solvents also have the advantage of being liquids or relatively low-melting solids with boiling points at least as high as the reaction temperatures used so that the condensation may be carried out conveniently at or below the reflux temperature of the solvent under atmospheric pressure.

Other practical advantages possessed by the solvents described include low toxicity and comparatively low price.

A mixture of two or more of the solvents described may be used instead of a single solvent.

For reasons of availability and price, the solvents most preferred for use in the process include 5-methyl-2-oxazolidinone, 5-phenyl-2-oxazolidinone, 2-pyrrolidinone, 1-methyl-2-pyrrolidinone, and 1,4-dimethyl-2-pyrrolidinone. Other solvents which may be used effectively in the process include 3,5-dimethyl-2-oxazolidinone, 5,5-dimethyl-2-oxazolidinone, 5-ethyl-2-oxazolidinone, 5-butyl-3-ethyl-2-oxazolidinone, 1-ethyl-2-pyrrolidinone, 1-isopropyl-4-methyl-2-pyrrolidinone, and tetrahydro-1,3-oxazin-2-one and its lower alkyl substituted homologs.

Solvents effective in the process have certain chemical as well as physical characteristics. For example, glycerol has many physical properties which are similar to those of the heterocyclic compounds listed above as being satisfactory for use in the process, e.g., boiling point, water solubility, and ability to dissolve urea. However, heating a solution of urea in glycerol produced a tarry solution from which no cyanuric acid was isolated.

The —NH—CO— structure in the operable heterocyclic solvents is evidently a critical factor, but not all heterocycles having this structure in the ring are operable in the process. For example, solutions of urea in 3-morpholinone, ε-caprolactam, succinimide, and phthalimide all formed tarry mixtures when heated under the conditions of the process and no cyanuric acid was isolated.

The temperature range within which this process is operable is from about 150° to about 250° C. The most preferred temperature is from about 180° to about 220° C.

The ratio of solvent to urea is not critical, since the oxazolidinones, tetrahydrooxazinones, and pyrrolidinones described act as catalyzing solvents and may be used in any convenient proportion so long as there is enough solvent to make a manageable reaction mixture. Preferably, enough solvent is used to dissolve all the urea and to make a solution of reasonably low viscosity.

Biuret or a mixture of biuret and urea may be used in place of urea, a mole of biuret being the equivalent of two moles of urea in the condensation.

The following examples represent various ways in which our process may be applied.

*Example 1*

A flask equipped with a stirrer, a thermometer, and a gas outlet was charged with 495 g. of 1-methyl-2-pyrrolidinone and 300 g. of urea. The mixture was heated and formed a clear yellowish solution at 130° C. At about 200° C. the solution began to bubble with the evolution of ammonia. The solution turned milky at 210° C. because of the formation of insoluble cyanuric acid. After the reaction mixture had been stirred for 2 hours at 195–210° C., the evolution of ammonia had nearly stopped. The mixture was cooled to room temperature and filtered to separate the precipitated cyanuric acid. The water-washed and dried product amounted to 150 g. and both infrared examination and titration with a standard sodium hydroxide solution indicated the product to be essentially pure cyanuric acid.

*Example 2*

A flask as described in Example 1 was loaded with 505 g. of 5-methyl-2-oxazolidinone which was then heated to 210° C. To the stirred hot solvent was added portionwise 300 g. of urea while the temperature of the flask contents was maintained at 180–210° C. The urea at first dissolved to make a clear yellowish solution which later turned white and opaque because of the precipitation of cyanuric acid. The reaction mixture was stirred and heated at 180–210° C. for 1 hour and then heated an additional 4½ hours at 210° C. The solvent was removed from the reaction mixture by vacuum distillation, leaving a white distillation residue which when washed with water to remove traces of solvent and dried amounted to 215 g. of white crystalline cyanuric acid.

*Example 3*

A flask equipped as in Example 1 was charged with 505 g. 5-methyl-2-oxazolidinone, 100 g. of water, and 300 g. of urea. The mixture was stirred and heated to 220° C., forming a clear, yellowish solution in the process. It became milky on further heating as evolution of ammonia began. The reaction mixture was heated at about 220° C. for 6 hours. At the end of this period, evolution of ammonia had substantially finished. The reaction mixture was cooled to room temperature and the white solid was separated by filtration. The solid was washed free of solvent with water and dried, whereupon 220 g. of white crystalline cyanuric acid was obtained.

*Example 4*

A mixture of 202 g. of 5-methyl-2-oxazolidinone and 120 g. of urea was heated to 130° C. The urea dissolved and ammonia was given off. The temperature of the mixture was held at 130–150° C. for 3 hours. Ammonia was given off during this period but the solution remained clear. Heating was continued at about 150° C. for another two hours with vacuum applied to speed the removal of ammonia. The solution remained essentially clear and apparently only a minor amount of cyanuric acid had formed although approximately the theoretical quantity of ammonia had been evolved. The reaction mixture was then heated to about 185° C. and in about 5 minutes a large amount of cyanuric acid had crystallized from the solution with no more ammonia being evolved. The reaction had evidently gone through an intermediate stage in which there was formed a complex or compound which was converted to cyanuric acid by heating above 150° C. The reaction mixture was poured into cold water and the water-insoluble cyanuric acid was separated by filtration. A yield of 75 g. of white crystalline cyanuric acid was obtained.

*Example 5*

A run was made as described in Example 4 except that 103 g. of biuret was used in place of 120 g. of urea. The yield and quality of the cyanuric acid product was essentially the same as that obtained from urea.

Similar yields of good quality cyanuric acid are obtained by following any of the procedures given in the above examples but using as the solvent 5-phenyl-2-oxazolidinone, 2-pyrrolidinone, 1,4-dimethyl-2-pyrrolidinone, or tetrahydro-1,3-oxazin-2-one.

The foregoing examples illustrate a number of ways in which our process may be operated advantageously and many other embodiments are possible. These examples, therefore, are not to be interpreted as limiting and the scope of the invention is defined by the appended claims.

We claim:

1. A process for making cyanuric acid which comprises mixing a substance selected from the group consisting of urea, biuret, and mixtures thereof with a solvent of the formula

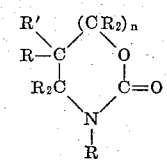

wherein each R is independently selected from the group consisting of hydrogen and lower alkyl groups containing 1–4 carbon atoms, R' is selected from the group consisting of hydrogen, lower alkyl groups containing 1–4 carbon atoms, and phenyl, and $n$ is 0–1, heating the thereby formed mixture at a temperature of about 150 to 250° C. for a period of time sufficient to form a substantial quantity of cyanuric acid, and separating the cyanuric acid product.

2. The process of claim 1 wherein a mixture of urea and a 2-oxazolidinone is heated.

3. The process of claim 2 wherein the mixture includes a minor proportion of water.

4. A process for making cyanuric acid which comprises mixing urea with 5-methyl-2-oxazolidinone, heating the thereby formed mixture at about 150 to 250° C. for about 1 to 8 hours, and separating the cyanuric acid product.

5. The process of claim 1 wherein before the mixture is heated at about 150–250° C., it is heated at about 130–150° C. until ammonia evolution is substantially complete.

6. The process of claim 5 wherein the process is operated in a continuous manner.

References Cited in the file of this patent

UNITED STATES PATENTS

| | | |
|---|---|---|
| 2,846,443 | Malusa et al. | Aug. 5, 1958 |
| 2,866,801 | Himel et al. | Dec. 30, 1958 |
| 2,872,447 | Oehlschlaeger | Feb. 3, 1959 |
| 2,952,679 | Perret | Sept. 13, 1960 |
| 2,971,024 | Zaugg et al. | Feb. 7, 1961 |
| 2,975,177 | Christmann | Mar. 14, 1961 |
| 3,004,945 | Fargo | Oct. 17, 1961 |
| 3,065,233 | Hopkins et al. | Nov. 20, 1962 |
| 3,068,118 | Beste et al. | Dec. 11, 1962 |

OTHER REFERENCES

Allied Chem. Bull, "Cyanuric Acid," p. 2, Allied Chem. Co., Nitrogen Div., N.Y. (May 1959).

UNITED STATES PATENT OFFICE
CERTIFICATE OF CORRECTION

Patent No. 3,164,591                              January 5, 1965

Wilhelm E. Walles et al.

It is hereby certified that error appears in the above numbered patent requiring correction and that the said Letters Patent should read as corrected below.

Column 6, line 5, for "3,068,118 Beste et al.----Dec. 11, 1962" read -- 3,068,188 Beste et al.--- Dec. 11, 1962 --.

Signed and sealed this 20th day of April 1965.

(SEAL)
Attest:

ERNEST W. SWIDER
Attesting Officer

EDWARD J. BRENNER
Commissioner of Patents